Nov. 16, 1948.  G. H. KAEMMERLING  2,453,991

RUBBER MOUNTING

Filed Dec. 11, 1944

Inventor
Gustav H. Kaemmerling
By Ralph Hammar
Attorney

Patented Nov. 16, 1948

2,453,991

UNITED STATES PATENT OFFICE 2,453,991

RUBBER MOUNTING

Gustav H. Kaemmerling, Erie, Pa., assignor to Lord Manufacturing Company, Erie, Pa., a corporation of Pennsylvania Application December 11, 1944, Serial No. 567,547

6 Claims. (Cl. 248—22)

In rubber mountings some arrangement is necessary to attach the mounting to the supporting and supported members. This invention is designed to simplify the attachment by utilizing a rubber arm on the mounting receivable in an opening in one of the members and held therein by a retaining shoulder on the arm. Further objects and advantages appear in the specification and claims.

Figure 1:
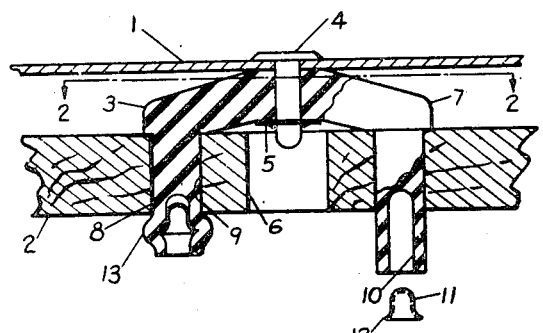
Figure 2:
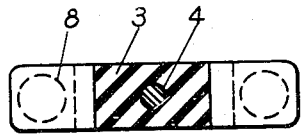
Figure 3:
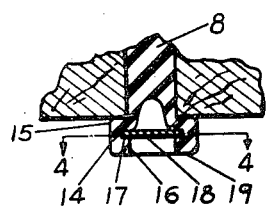
Figure 4:
Figure 5:
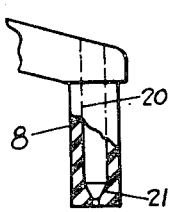
Figure 6:
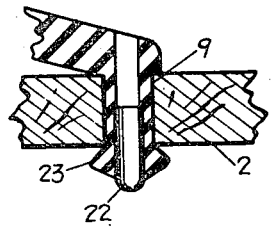

In the drawing, Fig. 1 is a side elevation, partly in section, of a mounting embodying my invention; Fig. 2 is a section on line 2—2 of Fig. 1; Fig. 3 is a section of a modification; Fig. 4 is a section on line 4—4 of Fig. 3; Fig. 5 is a view of another modification before assembly; and Fig. 6 is a sectional view of the Fig. 5 mounting in assembled position.

Referring to the drawing, 1 and 2 indicate spaced supports, one of which is the supporting and the other the supported member. The supports are connected by a rubber mounting comprising an arched rubber member 3 having its center connected to the support 1 by a pin 4 attached to the rubber member by a snap washer 5. The under side of the rubber member arches away from the upper surface of the support 2 to provide the necessary clearance for cushioning vibration. The lower end of the pin 4 is accessible for applying or removing the snap washer 5 through an opening 6 in the support 2. The opposite ends 7 of the rubber member rest on the upper surface of the support 2, and have integral rubber arms 8 projecting through openings 9 in the support. The lower ends of the arms 8 are provided with hollow passage-ways 10, the upper ends of which are slightly above the lower surface of the support. The outside diameter of the arms 8 is slightly greater than the inside diameter of the openings 9 so the mounting can be easily assembled on the support and will fit snugly in the openings.

After assembly a cup shaped expander 11 with an outwardly extending flange 12 is forced into the passage-way 10 expanding the rubber arm to the position indicated at the left of Fig. 1, providing a retaining shoulder 13. An upward pull on the rubber member 3 is resisted by the shoulder 13. The angle of the flange 12 is such that it grips the inner surface of the passage-way 10. While the expander will be securely held in place during the use of the mounting, it can be removed by expanding the lower end of the arm 8 to a diameter greater than the flange 12.

In Figs. 3 and 4 is shown an alternative construction for the lower ends of the arms 8 in which the lower ends of the arms are provided with enlarged portions 14 having shoulders 15 for engaging the under side of the support. The enlarged portions are provided with hollow passage-ways 16 and a groove 17 for receiving a retaining washer 18 which prevents collapse of the shoulder after the mounting is assembled. During assembly the enlarged portion 14 is compressed while passing through the openings 9 and expands to the position illustrated in Fig. 3 due to its inherent resilience upon leaving the opening 9. The mounting may be disassembled by turning back lips 19 at the lower side of the groove 17.

In Figs. 5 and 6 is shown another modification in which the rubber arms 8 are provided with a passage-way 20 accessible from the top of the mounting and having at the lower ends inwardly extending projections 21 which are slightly below the lower surface of the support 2 when the arms are positioned in the openings 9. The mounting is held in place by inserting a plug 22 through the upper end of the passage-way 20 and forcing the projection 21 outward to provide retaining shoulders 23. The plug 22 is preferably of slightly greater diameter than the passage-way 20 so that the lower ends of the arms 8 are expanded into tight engagement with the openings 9. The mounting may be disassembled by forcing the plugs out the lower ends of the passage-ways 20 permitting the arms to return to the position illustrated in Fig. 5.

What I claim as new is:

1. A mounting comprising a rubber arch having integral attaching arms at its ends and load attachment provisions at its center, said arms having hollow ends receivable in openings in a support, shoulders on the hollow ends for retaining the arms in the support, and retainers receivable in the hollow ends resisting collapse of the shoulders.

2. A rubber mounting having a part forming a vibration cushioning connection between spaced supports, one of which is the supporting and the other the supported member, and having a rubber arm projecting from said part having a hollow end receivable in an opening in one of the supports, and an expander in the hollow end for expanding it to provide a shoulder retaining the arm in the support.

3. A rubber mounting having a part forming a vibration cushioning connection between spaced supports, one of which is the supporting and the other the supported member, and having a rubber arm projecting from said part having a hollow end receivable in an opening in one of the supports, a shoulder on the hollow end for retaining the arm in the support, and a retainer receivable in the hollow end resisting collapse of the shoulder.

4. A rubber mounting having a part forming a vibration cushioning connection between spaced supports, one of which is the supporting and the other the supported member, and having a rubber arm projecting from said part having its free end receivable in an opening in one of the supports, a passageway through the arm accessible from the opposite end of the arm, and an inwardly extending projection in the passageway for cooperation with a plug to expand the free end of the arm and provide a retaining shoulder.

5. A rubber mounting having a part forming a vibration cushioning connection between spaced supports, one of which is the supporting and the other the supported member, and having a rubber arm projecting from said part receivable in an opening in one of the supports, a hollow projection on the arm of greater outside diameter than the opening compressible during insertion of the arm, and a passage-way into the projection for insertion of a retainer holding the projection in its expanded condition to retain the arm in the support.

6. A rubber mounting having a part forming a vibration cushioning connection between spaced supports, one of which is the supporting and the other the supported member, and having a rubber arm projecting from said part receivable in an opening in one of the supports, a hollow projection on the arm of greater outside diameter than the opening compressible during insertion of the arm, and an internal groove in the projection for receiving a retainer holding the projection in its expanded condition to retain the arm in the support.

GUSTAV H. KAEMMERLING.

REFERENCES CITED

The following references are of record in the file of this patent:

UNITED STATES PATENTS

| Number | Name | Date |
| --- | --- | --- |
| 475,343 | Rice | May 24, 1892 |
| 1,089,748 | Clark | Mar. 10, 1914 |
| 1,410,765 | Leas et al. | Mar. 28, 1922 |
| 2,037,032 | Lord | Apr. 14, 1936 |
| 2,115,653 | Snyder | Apr. 26, 1938 |
| 2,322,193 | Kaemmerling | June 15, 1943 |

FOREIGN PATENTS

| Number | Country | Date |
| --- | --- | --- |
| 342,105 | Great Britain | Jan. 29, 1931 |